Feb. 20, 1945. T. N. ADLAM Re. 22,603

STEAM AND WATER MIXING DEVICE

Original Filed June 20, 1942 3 Sheets-Sheet 1

INVENTOR.
THOMAS NAPIER ADLAM
BY
Clarke & Ott
ATTORNEYS

Feb. 20, 1945. T. N. ADLAM Re. 22,603

STEAM AND WATER MIXING DEVICE

Original Filed June 20, 1942 3 Sheets-Sheet 2

INVENTOR.
THOMAS NAPIER ADLAM
BY
Clark & Ott
ATTORNEYS

STEAM AND WATER MIXING DEVICE

Original Filed June 20, 1942 3 Sheets-Sheet 3

INVENTOR.
THOMAS NAPIER ADLAM
BY
Clark & Ott
ATTORNEYS

Reissued Feb. 20, 1945

Re. 22,603

UNITED STATES PATENT OFFICE 22,603

STEAM AND WATER MIXING DEVICE

Thomas Napier Adlam, West Orange, N. J., assignor to Sarco Company, Inc., New York, N. Y., a corporation of New York Original No. 2,335,250, dated November 30, 1943, Serial No. 447,754, June 20, 1942. Application for reissue November 22, 1944, Serial No. 564,632

8 Claims. (Cl. 236—12)

This invention relates to thermostatically controlled devices for mixing steam and water so as to provide a supply of hot water at a substantially constant predetermined temperature, and the invention has particular reference to a device of the indicated character including means for shutting off and maintaining the steam supply closed when the water supply is closed so as to prevent the delivery of steam or scalding hot water in the event of failure of the cold water supply and to avoid rupture of the thermostatic element by overheating the same.

The invention comprehends a mixing device of the aforesaid character which includes steam and water supply valves for admitting steam and water to a mixing chamber in which is arranged thermostatic means connected with the steam supply valve for regulating the flow of steam to the mixing chamber so as to provide a supply of hot water at a substantially constant temperature in accordance with a predetermined temperature setting of the thermostatic means and means actuated by the pressure differential on opposite sides of the water supply valve for shutting off the flow of steam to the mixing chamber when the water supply valve closes and for maintaining the steam supply in closed relation when the water supply is closed.

Another object in view is the provision of means located within the mixing chamber for diffusing and breaking up the steam into finely divided sprays as the same is fed into the said chamber so as to rapidly mix and blend with the water for quickly heating the same.

A further object of the invention resides in disposing the said thermostatic means within the mixing chamber at the opposite end from the steam and water inlets with the free end portion of said means surrounded by a tubular baffle so as to prevent contact of the steam and water therewith as the same enter the mixing chamber and which baffle defines within the mixing chamber a circuitous passageway for the hot water which causes the same to contact with the said thermostatic means at the end of the chamber remote from the said steam and water inlets.

With the foregoing and other objects in view, reference is now made to the following specification and accompanying drawings in which there is illustrated the preferred embodiment thereof.

Figure 1:
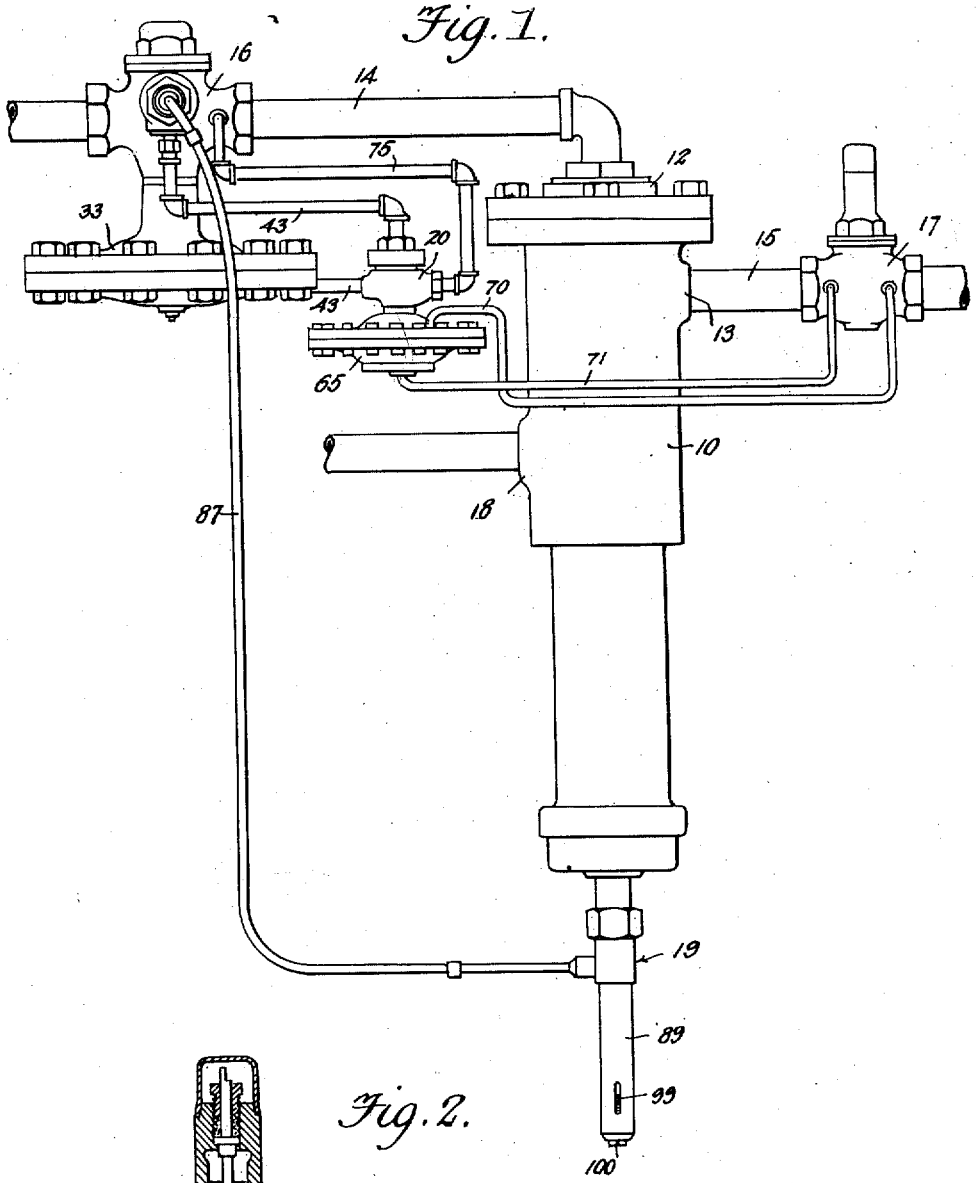
Fig. 1 is a side elevation of a thermostatically controlled steam and water mixing device constructed in accordance with the invention.
Figure 2:
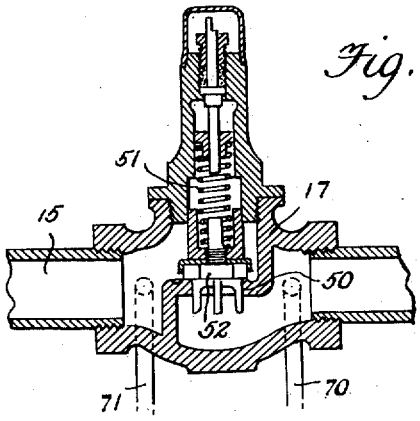
Fig. 2 is an enlarged vertical sectional view through the water supply valve.
Figure 3:
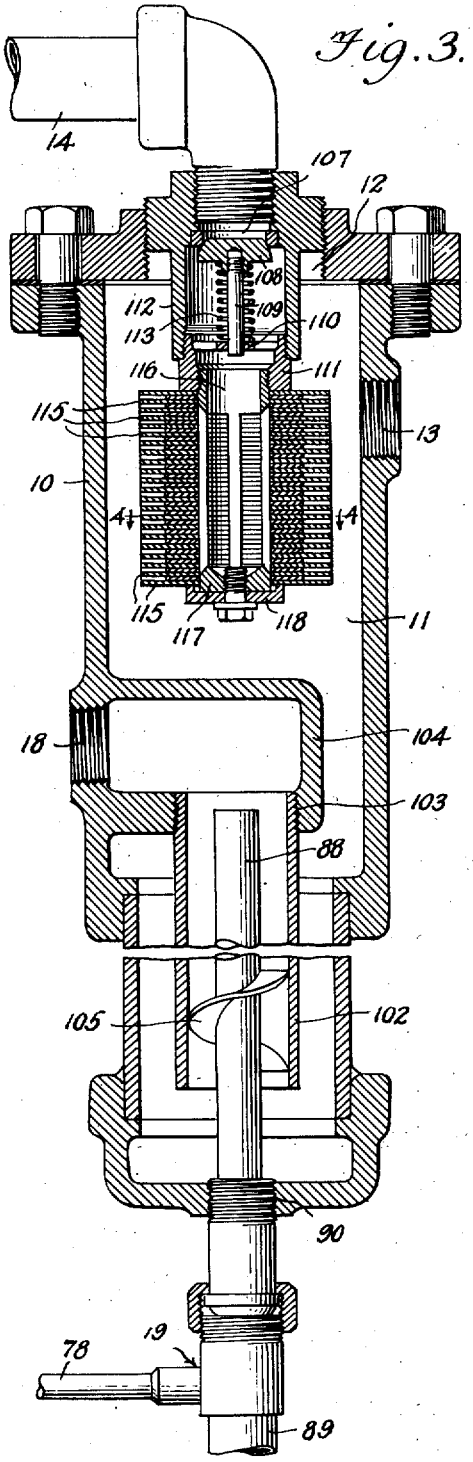
Fig. 3 is an enlarged fragmentary vertical sectional view through the casing defining the mixing chamber.
Figure 4:
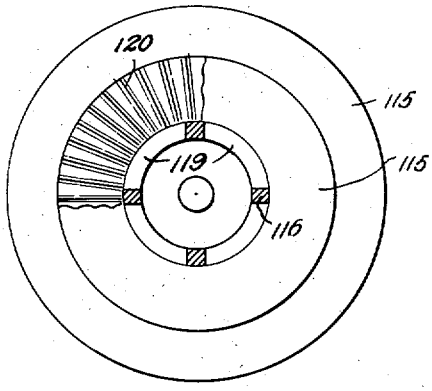
Fig. 4 is an enlarged horizontal sectional view through the steam diffusing element taken approximately on the line 4—4 of Fig. 3.
Figure 5:
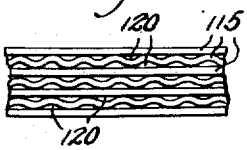
Fig. 5 is a fragmentary enlarged side view of the diffusing element.
Figure 6:
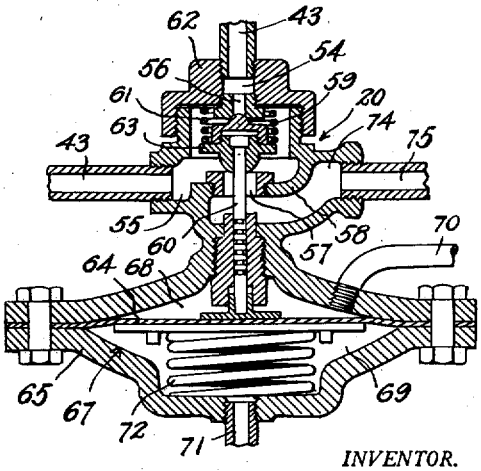
Fig. 6 is an enlarged sectional view through the auxiliary diaphragm valve.
Figure 7:
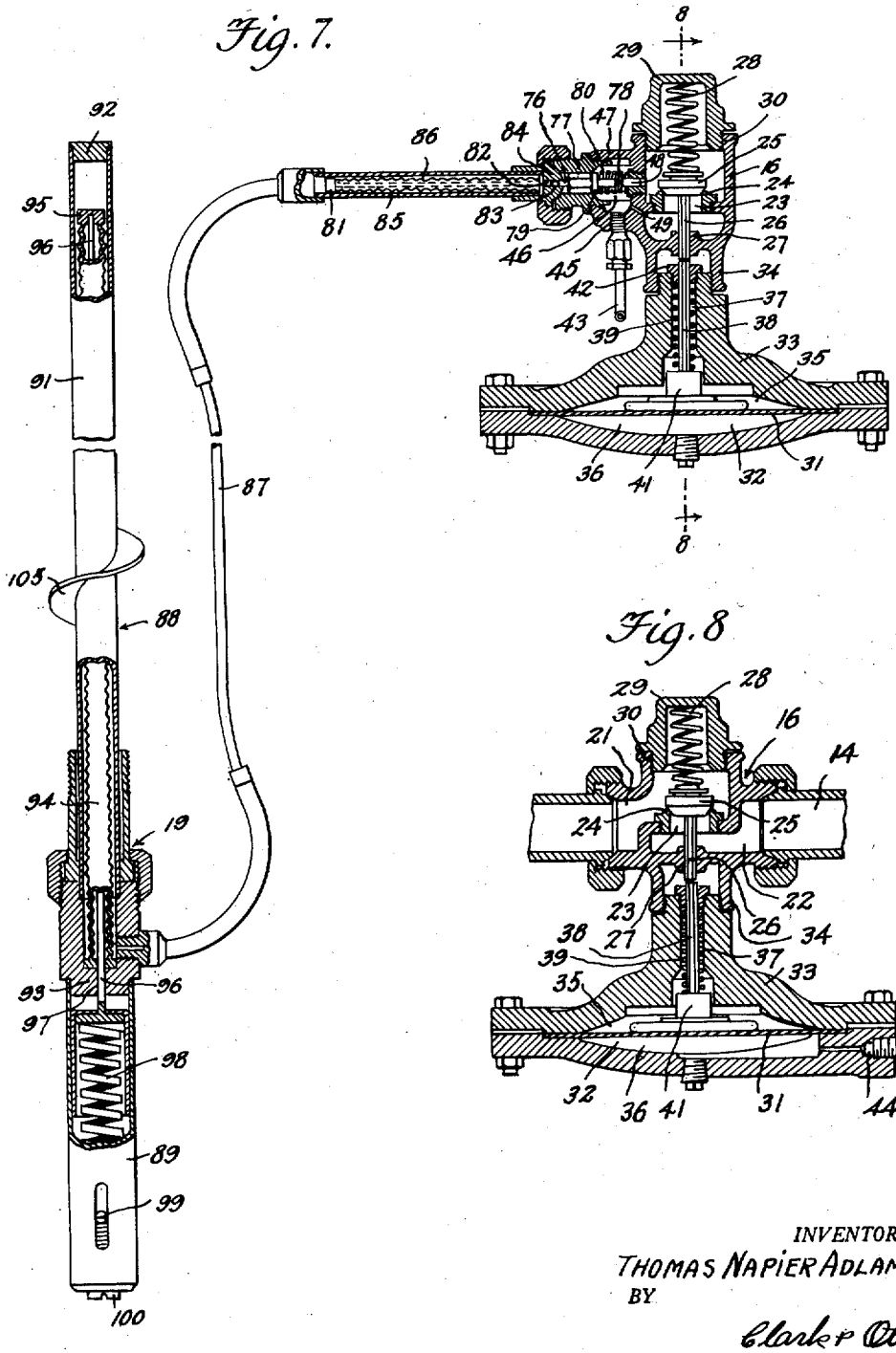
Fig. 7 is an enlarged fragmentary side view of the thermostatic means with parts broken away and shown in section and showing the same connected with the steam supply valve which is shown in section.
Figure 8:
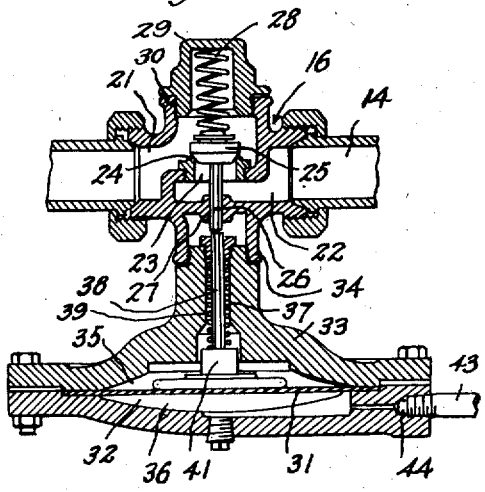
Fig. 8 is a sectional view through the steam supply valve taken approximately on the line 8—8 of Fig. 7.

Referring to the drawings by characters of reference, the mixing device includes a casing 10 defining a mixing chamber 11 and having steam and water inlets 12 and 13 opening into the mixing chamber and which are connected by suitable piping 14 and 15 to steam and water supply valves 16 and 17 for admitting steam and cold water to the mixing chamber where the same are mixed together so as to provide a supply of hot water which is discharged from the casing through the hot water outlet 18.

The steam supply valve 16 is controlled by thermostatic means indicated generally by the reference character 19 for regulating the flow of steam to the mixing chamber in accordance with the requirement for hot water and the said supply valve 16 is also controlled by an auxiliary diaphragm valve 20 connected with the water supply on opposite sides of the valve element of the water supply valve 17 for shutting off and maintaining the steam supply closed when the water supply is closed so as to prevent the delivery of steam or scalding hot water in the event of failure of the cold water supply and to avoid rupture of the thermostatic element by overheating the same.

The steam supply valve includes a valve body provided with inlet and outlet openings 21 and 22 and having a valve port 23 which defines a valve seat 24 and mounted for movement towards and away from said seat is a valve disk 25 carried by a valve stem 26 having its free end protruding through a guide opening 27 in the valve body. The valve disk 25 is normally maintained in closed relation upon the valve seat 24 by means of a coiled expansion spring 28 interposed between the outer face of the valve disk and a removable cap 29 threadedly engaged in an opening 30 in the valve body in alignment with the said valve port. The valve disk 25 is moved away from the valve seat 24 against the action of the spring 28 by the movement of a diaphragm 31 located in a chamber 32 of a diaphragm head 33 threadedly connected with a tubular extension 34 of the valve body.

The diaphragm 31 divides the chamber 32 into upper and lower compartments 35 and 36, the upper compartment 35 communicating with a central bore 37 in axial alignment with the valve port 23, and located in said bore for longitudinal reciprocatory movement is a spindle 38 interposed between the free end of the valve stem 26 and the upper face of the diaphragm 31. A coiled expansion spring 39 surrounds the spindle 38 and is disposed between the headed outer end 41 of the spindle and a bearing plug 42 through which the inner end of the spindle projects and which spring maintains the head 41 of the spindle in engagement with the diaphragm 31.

The outer compartment 36 has communication with the steam supply on the inlet side of the valve port 23 through a conduit 43 threadedly engaged in openings 44 and 45 leading respectively to said compartment 36 and to a chamber 46 formed in a tubular boss 47 of the valve body and which chamber opens into said steam supply through a needle valve 48. The chamber 46 also communicates with the outlet side of the valve port 23 through a vent passage 49. The needle valve 48 is controlled by the thermostatic means 19 to admit steam into the chamber 46 and thence into the compartment 36 through the conduit 43 for forcing the diaphragm 31 upwardly thereby moving the spindle 38 into engagement with the valve stem 26 so as to raise the valve disk 25 from its seat. Upon the functioning of the thermostatic means 19 to close the needle valve 48, the steam pressure in the chamber 46 is dissipated through the vent passage 49 and the steam pressure in the compartment 36 is dissipated through the auxiliary valve 20 as hereinafter explained, thus permitting retraction of the diaphragm 31 by the expansion spring 39 and the movement of the valve disk 25 towards its seat by the action of the spring 28.

The water supply valve 17 is of the adjustable check valve type and admits water to the mixing chamber 11 through a valve port 50, the valve spring 51 thereof functioning to move the valve disk 52 to close the said port when the pressure on the outlet side of the said port equals the pressure on the inlet side thereof.

In order to automatically shut off the supply of steam to the mixing chamber from the steam supply valve 16 when the water supply valve 17 closes and to maintain the steam supply valve in closed relation when the water supply valve is closed, the auxiliary diaphragm valve 20 is interposed in the conduit line 43, the upper section thereof leading from the chamber 46 to the inlet 54 in the auxiliary diaphragm valve 20 and the lower section of said conduit leading from the outlet 55 of the said auxiliary diaphragm valve to the lower compartment 36 of the diaphragm head 33 of the steam supply valve 16.

The auxiliary diaphragm valve 20 includes aligned valve seats defining ports 56 and 57, the former being arranged at the inner end of the inlet 54 and the latter extending through an opening in the partition 58 of the auxiliary valve body. The valve ports 56 and 57 are controlled by a double faced valve element 59 secured to the upper end of a valve stem 60 mounted for reciprocatory movement to thereby move the said valve element towards and away from the valve ports 56 and 57 respectively. A coiled expansion spring 61 interposed between the cap 62 of the auxiliary valve body and the peripheral flange 63 of the valve element 59 maintains the lower end of the stem 60 in seated engagement with the diaphragm 64 in the diaphragm head 65 carried by the auxiliary valve body.

The diaphragm 64 is disposed in a chamber 67 in the said head 65 and divides the said chamber into upper and lower compartments 68 and 69, the upper compartment 68 being in communication by means of piping 70 with the inlet side of the water supply valve 17 and the lower compartment 69 being in communication with the outlet side of the water supply valve by means of piping 71. A coiled expansion spring 72 is arranged in the lower compartment 69 between the underside of the diaphragm 64 and the lower end of the diaphragm head 65. The said spring 72 exerts a tension on the diaphragm 64 in opposition to the spring 61 and in opposition to the water pressure in the upper compartment 68 connected with the inlet side of the water supply valve 17.

The upper and lower compartments 68 and 69 being thus filled with water under pressure from the opposite sides of the valve port 50 of the water supply valve 17, the diaphragm 64 between said compartments will be moved in accordance with the pressure exerted on opposite sides thereof. Thus when the valve disk 52 is in closed relation upon the valve port 50, the water pressure on opposite sides of the said valve port and on the opposite sides of the diaphragm 64 will be substantially equal so that the spring 72 functions to move the diaphragm 64 to close the valve port 56 to thereby shut off the flow of steam through the conduit 43 leading to the lower compartment 36 of the steam supply valve 16 and thus effect a closing of the valve port 23 thereof and a shutting off of the flow of steam to the mixing chamber. When hot water is drawn from the mixing chamber which effects a reduction of pressure in the water on the outlet side of the water supply valve 17, a corresponding reduction in pressure takes place in the lower compartment 69 of the diaphragm head 65 of the auxiliary valve 20 to thereby move the diaphragm 64 downwardly against the action of the spring 72 which, in this instance, serves as a buffer against the greater water pressure exerted above the diaphragm. The downward movement of the diaphragm 64 permits the spring 61 to move the valve element 59 downwardly so as to open the valve port 56 thus allowing the flow of steam pressure through the conduit 43 and into the lower compartment 36 of the steam supply valve 16, thus moving the diaphragm 31 thereof upwardly and the valve disk 25 away from the valve port 23 so as to open the said port for the passage of steam through the said supply valve 16 and into the mixing chamber.

The auxiliary diaphragm valve 20 is provided with a relief outlet 74 on the opposite side of the partition 58 from the outlet 55 thereof and said relief outlet communicates through a conduit 75 with the outlet side 22 of the steam supply valve 16. It is apparent that when the valve element 59 of the said auxiliary diaphragm valve 20 is moved so as to close the inlet port 56 thereof, the port 57 will be in open relation to permit of the venting of the steam pressure in the lower compartment 36 of the diaphragm head 33 of the steam supply valve 16 through the said valve port 57 and thence through the relief outlet 74 to the outlet side of the steam supply valve 16. When the inlet port 56 of the auxiliary diaphragm valve 20 is opened, the valve element 59 closes the valve port 57 to prevent steam pressure being dissipated through the relief port 74.

The thermostatic element 19 includes a valve plunger 76 which is mounted in a bushing 77 threadedly engaged in the tubular boss 47 of the valve body for reciprocatory movement towards and away from the needle valve 48 and which plunger is provided with a conical shaped free end 78 adapted to engage the seat of the needle valve 48 for closing the same. The valve plunger 76 is provided with a collar 79 and interposed between the collar and the inner end of the needle valve in surrounding relation with the protruding end of the plunger 76 is a coiled expansion spring 80 which functions to normally retain the plunger in retracted position out of engagement with the valve seat.

The valve plunger 76 is projected into engagement with the valve seat of the needle valve 48 by means of the expansion of a thermal fluid acting upon a piston head 81 carried by a piston rod 82 which rod protrudes through the aperture 83 in the head 84 of a tubular shell 85 so as to dispose the free end of the said rod in axial alignment with the plunger 76 for engagement with the outer end thereof.

Located within the tubular shell 85 in spaced relation thereto is an expansible and contractible tube 86 secured at one end to the head 84 of the said tubular shell 85 and at its opposite end to the piston head 81 which provides a sealing means enclosing the piston rod 82.

The tubular shell 85 is in communication through a conduit 87 with a thermostatic element consisting of a control bulb 88 and a regulating head 89 and the said element is secured in an opening 90 in the lower end of the casing 10 to dispose the control bulb 88 in inwardly projecting relation in the lower end of the mixing chamber. The control bulb 88 includes a tubular shell 91 having a closed free end 92 and an apertured inner end 93 to which is secured an expansible and contractile sealing tube 94 arranged within the shell in spaced relation with the wall thereof and having its free end closed by a head 95 to which is secured an adjusting rod 96 located within the sealing tube 94 and projecting through the aperture 97 in the inner end 93.

The regulating head 89 of the thermostatic element is provided with a relief spring 98 which is interposed between the free end of the adjusting rod 96 and an adjusting screw 99 in the end of the head 89 which screw is adapted to be turned in opposite directions by a key engaging the projecting end 100 thereof for moving the adjusting rod 96 longitudinally of the tubular shell 91 so as to extend or contract the sealing tube 94 to thereby vary the space between the free end of the shell 91 and the head 95 of the sealing tube 94.

The space between the sealing tube 86 and the tubular shell 85, as well as the conduit 87, and the space between the sealing tube 94 and the tubular shell 91, being filled with the thermal fluid, any increase or decrease in the temperature of the mixed water in the mixing chamber 11 will effect a corresponding expansion or contraction of the thermal fluid to thereby control the needle valve 48 so as to regulate the admission of steam into the mixing chamber through the steam supply valve 16 to thereby provide a continuous supply of hot water at the discharge outlet 18 of the mixing chamber at a substantially constant temperature in accordance with a predetermined temperature setting of the adjusting screw 99.

The casing 10 is provided with a tubular baffle 102 threadedly engaged at its upper end in an opening 103 in a partition 104 surrounding the discharge outlet 18 and which baffle depends in surrounding relation with the major portion of the control bulb 88 so as to prevent contact of the steam and water therewith as the same enter the mixing chamber, the baffle further defining within the mixing chamber a circuitous passageway for the hot water which causes the water to contact with the control bulb 88 at the end of the mixing chamber remote from the steam and water inlet. The tubular shell 91 is provided with a deflector 105 extending spirally about the outer face thereof adjacent the lower end of the tubular baffle 102 for imparting a swirling motion to the hot water as the same passes through the tubular baffle so as to more evenly heat the tubular shell 91.

Steam from the steam supply valve 16 enters the mixing chamber 11 through a valve port 107 in the upper end thereof which is closed by a valve disk 108 carried by a valve rod 109. The said valve rod is slidable in a guide opening in a spider 110 of a nipple 111 threadedly engaged in the lower end of a tubular skirt 112 surrounding the valve port 107. A coiled expansible spring 113 disposed between the valve disk 108 and the spider 110 in surrounding relation to the valve rod 109 functions to normally maintain the valve disk in closed relation.

In order to provide means for diffusing and breaking up the steam into fine sprays as the same is mixed with the water in the mixing chamber, a series of apertured disks 115 are provided which are disposed in stacked formation on a tubular core 116 secured at its upper end in the nipple 111. The said tubular core has a closed lower end 117 and removably secured thereto is a clamping washer 118 impinged against the lowermost disk 115 for securing the disk in stacked formation on the core between the nipple 111 and the said clamping washer.

The tubular core 116 is formed with circumferentially spaced longitudinally extending slots 119 and each alternate disk is provided with circumferentially spaced radially extending flutes defining on the opposite faces thereof steam outlet passages 120 which are preferably of a few thousandths of an inch in depth.

It is to be understood that the steam and water supply valves 16 and 17 and the auxiliary valve 20 may be set to accommodate steam and water at any desired relative pressures, the steam pressure being sufficiently in excess of the water pressure to effect rapid mixing of the steam with the water and a corresponding rapid heating of the water so that a continuous supply of hot water at a predetermined temperature may be withdrawn from the mixing device.

It will also be apparent from the foregoing that the steam supply valve 16 is maintained in closed relation when the water supply valve 17 is closed and during any failure of the water supply the spring 72 functions to close the auxiliary valve 20 to thereby close the steam supply valve and cut off the flow of steam to the mixing chamber. The shutting off of the delivery of steam to the mixing chamber when the flow of water thereto has been cut off prevents the delivery of steam or scalding hot water from the mixing chamber which would scald or injure a person using the same and which also prevents rupture of the thermostatice element by the overheating thereof.

What is claimed is:

1. In a device for mixing steam and water to provide a hot water supply, a casing providing a mixing chamber and having steam and water inlets and a hot water outlet, steam and water supply valves having movable valve elements for regulating the opening and closing of ports through which steam and water pass respectively to the mixing chamber, said steam supply valve having steam pressure actuated means for moving the valve element thereof in one direction, thermostatic means for controlling the supply of steam to said steam pressure actuated means to thereby control the steam supply valve so as to regulate the flow of steam to the mixing chamber, and means connected with the water supply on opposite sides of the valve element of the water supply valve for controlling the said steam pressure actuated means by the pres sure differential on opposite sides of the valve element of the water supply valve for maintaining the steam supply valve closed when the water supply valve is closed.

2. In a device for mixing steam and water to provide a hot water supply, a casing providing a mixing chamber and having steam and water inlets and a hot water outlet, steam and water supply valves having movable valve elements for regulating the opening and closing of ports through which the steam and water pass respectively to the mixing chamber, said steam supply valve having a diaphragm and means associated therewith engaging the valve element of the steam supply valve for moving the same in response to the movement of the diaphragm, said diaphragm being moved in one direction by steam pressure from the steam supply line, thermostatic means for controlling the flow of steam to said diaphragm from said steam supply line to thereby control the steam supply valve so as to regulate the flow of steam to the mixing chamber, and means connected with the water supply on opposite sides of the valve element of the water supply valve for controlling the flow of steam to said diaphragm by the pressure differential on opposite sides of the valve element of the water supply valve to thereby maintain the steam supply valve closed when the water supply valve is closed.

3. In a device of the indicated character, a casing providing a mixing chamber and having steam and water inlets and a hot water outlet, steam and water supply valves having movable valve elements for regulating the opening and closing of ports through which steam and water pass respectively to the mixing chamber, said steam supply valve having a diaphragm and means associated therewith engaging the valve element of said steam supply valve for moving the same in response to the movement of the diaphragm, an auxiliary steam line connected with the inlet side of said steam supply valve for admitting steam pressure to the diaphragm for moving the same in one direction, thermostatic means for regulating the flow of steam through said auxiliary steam line to thereby regulate the flow of steam to the mixing chamber, an auxiliary valve having a valve element interposed in said auxiliary steam line, and means connected with the water supply on opposite sides of the valve element of the water supply valve for controlling the valve element of said auxiliary valve to thereby shut off the flow of steam to the diaphragm of the steam supply valve when the water supply valve is closed so as to maintain the steam supply valve closed when the water supply valve is closed.

4. In a device of the indicated character, a casing providing a mixing chamber and having steam and water inlets and a hot water outlet, steam and water supply valves having movable valve elements for regulating the opening and closing of ports through which the steam and water pass respectively to the mixing chamber, said steam supply valve having a diaphragm and means associated therewith engaging the valve element of said steam supply valve for moving the same in response to the movement of the diaphragm, an auxiliary steam line connected with the inlet side of said steam supply valve for admitting steam pressure to the diaphragm for moving the same in one direction, an auxiliary valve having a valve element interposed in said auxiliary steam line, and means connected with the water supply on opposite sides of the valve element of the water supply valve for controlling the valve element of said auxiliary valve to thereby shut off the flow of steam to the diaphragm of the steam supply valve when the water supply valve is closed so as to maintain the steam supply valve closed when the water supply valve is closed.

5. In a device of the indicated character, a casing providing a mixing chamber and having steam and water inlets and a hot water outlet, steam and water supply valves having movable valve elements for regulating the opening and closing of ports through which the steam and water pass respectively to the mixing chamber, said steam supply valve having a diaphragm and means associated therewith engaging the valve element of said steam supply valve for moving the same in response to the movement of the diaphragm, an auxiliary steam line connected with the inlet side of said steam supply valve for admitting steam pressure to the diaphragm for moving the same in one direction, an auxiliary valve having a valve element interposed in said auxiliary steam line, said auxiliary valve having a diaphragm and means associated therewith engaging the valve element thereof for moving the same in response to the movement of the diaphragm, and conduits connected with the water supply on opposite sides of the valve element of the water supply valve and establishing communication with the opposite sides of the diaphragm of the auxiliary valve for moving the diaphragm thereof in response to pressure differential in the water on opposite sides of the valve element of the water supply valve to thereby close said auxiliary steam line when the water supply valve is closed so as to maintain the steam supply valve closed when the water supply valve is closed.

6. In a device of the indicated character, a casing providing a mixing chamber and having steam and water inlets and a hot water outlet, steam and water supply valves having movable valve elements for regulating the opening and closing of the ports through which the steam and water pass respectively to the mixing chamber, said steam supply valve having pressure actuated means for moving the valve element thereof in one direction, an auxiliary steam line connected with the inlet side of said steam supply valve for controlling the said pressure actuated means, an auxiliary valve having a valve element interposed in said auxiliary steam line, and means connected with the water supply on opposite sides of the valve element of the water supply valve for controlling the valve element of said auxiliary valve to thereby shut off the flow of steam in the auxiliary steam line by the puressure differential on opposite sides of the valve element of the water supply valve for maintaining the steam supply valve closed when the water supply valve is closed.

7. In a device for mixing steam and water to provide a hot water supply, a casing providing a mixing chamber and having steam and water inlets and a hot water outlet, steam and water supply valves having movable valve elements for regulating the opening and closing of ports through which the steam and water pass respectively to the mixing chamber, said steam supply valve having steam pressure actuated means for moving the valve element thereof in one direction, thermostatic means for controlling the supply of steam to said steam pressure actuated means to thereby control the steam supply valve so as to regulate the flow of steam to the mixing chamber, and means connected with the water supply for controlling the said steam pressure actuated means by the pressure differential on opposite sides of the valve element of the water supply valve for maintaining the steam supply valve closed when the water supply valve is closed.

8. In a device for mixing steam and water to provide a hot water supply, a casing providing a mixing chamber and having steam and water inlets and a hot water outlet, steam and water supply valves having movable valve elements for regulating the opening and closing of ports through which the steam and water pass respectively to the mixing chamber, said steam supply valve having steam pressure actuated means for moving the valve element thereof in one direction, and means connected with the water supply for controlling the said steam pressure actuated means by the pressure differential on opposite sides of the valve element of the water supply valve for maintaining the steam supply valve closed when the water supply valve is closed.

THOMAS NAPIER ADLAM.